(12) United States Patent
Farquharson et al.

(10) Patent No.: US 10,100,681 B2
(45) Date of Patent: Oct. 16, 2018

(54) SYSTEM AND METHOD FOR INCREASING THE RESPONSIVENESS OF A DUCT FIRED, COMBINED CYCLE, POWER GENERATION PLANT

(71) Applicant: Siemens Aktiengesellschaft, München (DE)

(72) Inventors: Marlon H. Farquharson, Orlando, FL (US); Ray L. Johnson, Chuluota, FL (US); Michael Scheurlen, Orlando, FL (US); Monica B. Hansel, Melbourne, FL (US); James H. Sharp, Orlando, FL (US); Karin Marjan Oostendorp-Kramer, Oegstgeest (NL)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/516,255

(22) PCT Filed: Oct. 24, 2014

(86) PCT No.: PCT/US2014/062080
§ 371 (c)(1),
(2) Date: Mar. 31, 2017

(87) PCT Pub. No.: WO2016/064411
PCT Pub. Date: Apr. 28, 2016

(65) Prior Publication Data
US 2017/0298782 A1    Oct. 19, 2017

(51) Int. Cl.
*F01K 23/10*    (2006.01)

(52) U.S. Cl.
CPC .......... *F01K 23/101* (2013.01); *F01K 23/105* (2013.01); *Y02E 20/16* (2013.01)

(58) Field of Classification Search
CPC ........ F01K 3/24; F01K 23/101; F01K 23/103; F01K 23/105
See application file for complete search history.

(56) References Cited

U.S. PATENT DOCUMENTS

| 3,505,811 A | 4/1970 | Underwood |
|---|---|---|
| 3,980,100 A | 9/1976 | Gasparoli |
| (Continued) | | |

FOREIGN PATENT DOCUMENTS

| CN | 102072481 A | 5/2011 |
|---|---|---|
| CN | 103154116 A | 6/2013 |

OTHER PUBLICATIONS

PCT International Search Report and Written Opinion dated Jun. 24, 2015 corresponding to PCT Application No. PCT/US2014/062080 filed Oct. 24, 2014.

*Primary Examiner* — Jonathan Matthias (57) ABSTRACT

A system and method for increasing the responsiveness of a duct fired, combined cycle power generation plant (12) via operating one or more gas turbine engines (14) at a part load condition less than 100 percent load, one or more steam turbine engines (16), and one or more supplemental burners (18) providing additional heat to a heat recovery steam generator (20) upstream from the steam turbine engine (16) is disclosed. The combination of the steam turbine engines (16) and supplemental burners (18) operating together with gas turbine engines (14) at a part load condition enables the system to quickly change output to accommodate changes in output demand of the duct fired, combined cycle power generation plant (12). By operating the one or more gas turbine engines (14) at a part load condition, the gas turbine engines (14) are able to be used to increase net output of the combined cycle power generation plant (12) faster than relying on increasing output via duct firing.

9 Claims, 5 Drawing Sheets

(56) References Cited

U.S. PATENT DOCUMENTS

| | | |
|---|---|---|
| 2004/0060299 A1 | 4/2004 | Liebig |
| 2004/0065089 A1* | 4/2004 | Liebig .................. F01K 23/103 60/772 |
| 2010/0058764 A1 | 3/2010 | Conchieri |
| 2014/0090356 A1 | 4/2014 | Nakamura et al. |

* cited by examiner

SYSTEM AND METHOD FOR INCREASING THE RESPONSIVENESS OF A DUCT FIRED, COMBINED CYCLE, POWER GENERATION PLANT

FIELD OF THE INVENTION

The present invention is directed generally to gas turbine systems, and more particularly to duct fired, combined cycle power generation plants.

BACKGROUND OF THE INVENTION

Over the past decade, an increasing amount of renewable energy supply has been added to the power grids of major markets, such as the United States and Europe. One of the challenges in the use of renewable energy is that the renewable energy source must be supplemented by using energy storage to prevent supply gaps due to its intermittent and unpredictable nature. Another challenge is the need for electricity to heat and cool homes during the different seasons as well as the operating strategy of various sections of a power grid. The seasonal use of power does not necessarily match up with the availability of power from renewable resources. With all these influencing factors on the electrical power supply, combined cycle power plants must be able to ramp up and down quickly to respond to the demand. Such is especially true where a financial penalty is applicable when a power plant cannot reach a load requested by power grid operators.

Conventional power generation systems have used simple cycle power plants to handle loads requiring fast ramp up and ramp down intervals. While simple cycle power plants are capable of fast changes in output, the simple cycle power plants cost more to operate as their overall efficiency is below that of a combined cycle plant and environmental considerations such as emissions associated with the installation of a simple cycle power plant can undermine their viability. Other conventional combined cycle power generation systems have used duct firing in a heat recovery steam generator to increase the steam generated in the heat recovery steam generator to increase output from steam turbine engines. This system has a slow response time because the system is thermodynamically limited by the time required for the additional steam to be generated and the steam turbine engines to respond with greater output once the additional steam input is received. Currently, the maximum plant ramp up capability is just under five megawatts per minute. However, power grid controllers are more often requesting a ramp up rate far faster than five megawatts per minute. Thus, a need exists for a power plant capable with a faster ramp up rate.

SUMMARY OF THE INVENTION

A system and method for increasing the responsiveness of a duct fired, combined cycle power generation plant via operating one or more gas turbine engines at a part load condition less than 100 percent load, one or more steam turbine engines, and one or more supplemental burners providing additional heat to a heat recovery steam generator (HRSG) upstream from the steam turbine engine is disclosed. The combination of the steam turbine engines and supplemental burners operating together with gas turbine engines at a part load condition enables the system to quickly change output to accommodate changes in output demand of the duct fired, combined cycle power generation plant. By operating the one or more gas turbine engines at a part load condition, the gas turbine engines are able to be used to increase net output of the combined cycle power generation plant faster than relying on increasing output via duct firing.

In at least one embodiment, the system may include a method for increasing the responsiveness of a duct fired, combined cycle power generation plant such that the gas turbine engines are only operating at part load, thereby providing the ability for the output of the gas turbine engines to be increased or decreased to change the output of the combined cycle power generation plant. As such, because the output of a gas turbine engine may be changed more rapidly than the output of a steam turbine engine in a combined cycle configuration, the output of the combined cycle power generation plant may be changed more rapidly when the output of a gas turbine engine is changed. In at least one embodiment, the method for increasing the responsiveness of a duct fired, combined cycle power generation plant may include operating one or more gas turbine engines at a part load condition less than 100 percent load and operating one or more steam turbine engines via steam created at least in part from heat generated by the gas turbine engine. The method may also include firing one or more supplemental burners to provide additional heat to a heat recovery steam generator upstream from the steam turbine engine such that combined output of the gas turbine engine at part load and the steam turbine engine with additional steam input generated by firing the supplemental burner upstream of the heat recovery steam generator upstream may be at least as great as operating the gas turbine engine at 100 percent load condition and the steam turbine engine at 100 percent load condition. The method may also include controlling the gas turbine engine to change output of the gas turbine engine to accommodate changes in output demand of the duct fired, combined cycle power generation plant.

In at least one embodiment, controlling the gas turbine engine to change output of the gas turbine engine to accommodate changes in output demand includes increasing output of the gas turbine engine to increase output of the duct fired, combined cycle power generation plant to accommodate an increase in output demand. More specifically, increasing output of the duct fired, combined cycle power generation plant to accommodate an increase in output demand may include increasing output of the duct fired, combined cycle power generation plant at a rate of at least five megawatts per minute. In another embodiment, increasing output of the duct fired, combined cycle power generation plant to accommodate an increase in output demand may include increasing output of the duct fired, combined cycle power generation plant at a rate of at least ten megawatts per minute. In yet another embodiment, increasing output of the duct fired, combined cycle power generation plant to accommodate an increase in output demand comprises increasing output of the duct fired, combined cycle power generation plant at a rate of at least fifteen megawatts per minute.

The method may include operating one or more gas turbine engines at a part load condition less than 100 percent load such that the gas turbine engine is operated at a part load condition less than 90-95 percent load. The method may also include a ramp up process in which the gas turbine engine is ramped up followed by an increase in output of the supplemental burner. The method may include a ramp down process in which output of the gas turbine engine is ramped down. The ramp down process in which the output of the gas turbine engine is ramped down may be followed by a decrease in output of the supplemental burner.

The method may include firing one or more supplemental burners to provide additional heat to a heat recovery steam generator upstream by firing the supplemental burners during a startup process in which the gas turbine engine starts operating to enable the heat recovery steam generator to warm up faster and allow excess steam to be provided to gland seals and a condenser.

An advantage of the system is that the combined cycle power generation plant may be operated with the capacity for very rapid load changes via adjusting the output of one or more gas turbine engines.

Another advantage of the system is that the combined cycle power generation plant may be operated with the capacity to increase or decrease output of the plant by as much as 30 megawatts per minute.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-5, a system 10 and method for increasing the responsiveness of a duct fired, combined cycle power generation plant 12 via operating one or more gas turbine engines 14 at a part load condition less than 100 percent load, one or more steam turbine engines 16, and one or more supplemental burners 18 providing additional heat to a heat recovery steam generator 20 upstream from the steam turbine engine 16 is disclosed. The combination of the steam turbine engines 16 and supplemental burners 18 operating together with gas turbine engines 14 at a part load condition enables the system 10 to quickly change output to accommodate changes in output demand of the duct fired, combined cycle power generation plant 12. By operating the one or more gas turbine engines 14 at a part load condition, the gas turbine engines 14 are able to be used to increase net output of the combined cycle power generation plant 12 faster than relying on increasing output via duct firing.

Figure 2:
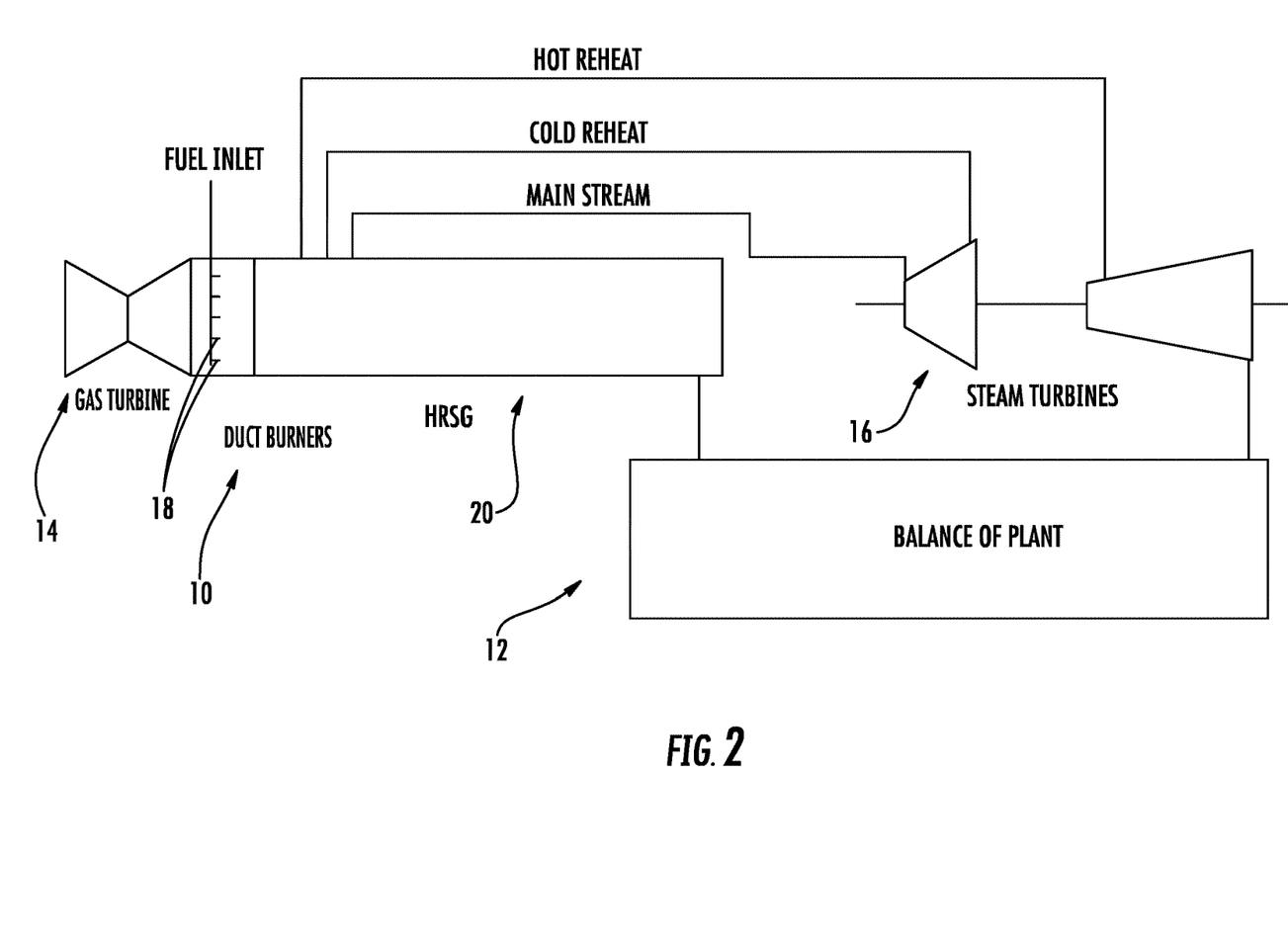
FIG. 2 is a schematic diagram of the system for increasing the responsiveness of the duct fired, combined cycle power generation plant.

In at least one embodiment, the system 10 may include a method for increasing the responsiveness of a duct fired, combined cycle power generation plant 12 such that the gas turbine engines 14 are only operating at part load, thereby providing the ability for the output of the gas turbine engines 14 to be increased or decreased to change the output of the combined cycle power generation plant 12. As such, because the output of a gas turbine engine 14 may be changed more rapidly than the output of a steam turbine engines 16, the output of the combined cycle power generation plant 12 may be changed more rapidly when the output of a gas turbine engine 14 is changed. In at least one embodiment, the system 10 may include operating one or more gas turbine engines 14 at a part load condition less than 100 percent load and operating one or more steam turbine engines 16. In at least one embodiment, the steam turbine engine 16 may be operated via steam created at least in part from heat generated by the gas turbine engine 16. The method may include firing one or more supplemental burners 18, as shown in FIG. 2, to provide additional heat to a heat recovery steam generator 20 upstream from the steam turbine engine 16 such that combined output of the gas turbine engine 14 at part load and the steam turbine engine 16 with additional steam input generated by firing the supplemental burner 18 upstream of the heat recovery steam generator 20 upstream is at least as great as operating the gas turbine engine 14 at 100 percent load condition and the steam turbine engine 14 at 100 percent load condition. The method may also include controlling the gas turbine engine 14 to change output of the gas turbine engine 14 to accommodate changes in output demand placed on the duct fired, combined cycle power generation plant 12 by controllers of the power grid to which the combined cycle power generation plant 12 is connected or by other controlling decision makers and the like.

The gas turbine engines 14 used within the system 10 may have any appropriate configuration enabling the gas turbine engines 14 to operate on a fuel source and create rotary motion of a shaft coupled to a generator to create power. In at least one embodiment, the gas turbine engine 14 may be controlled such that the controlling the gas turbine engine 14 to change output of the gas turbine engine 14 to accommodate changes in output demand includes increasing output of the gas turbine engine 14 to increase output of the duct fired, combined cycle power generation plant 12 to accommodate an increase in output demand. In at least one embodiment, the gas turbine engine 14 may accommodate changes in output demand by increasing output of the duct fired, combined cycle power generation plant 12 at a rate of at least five megawatts per minute. In another embodiment, the gas turbine engine 14 may accommodate changes in output demand by increasing output of the duct fired, combined cycle power generation plant 12 at a rate of at least ten megawatts per minute. In yet another embodiment, the gas turbine engine 14 may accommodate changes in output demand by increasing output by increasing output of the duct fired, combined cycle power generation plant 12 at a rate of at least fifteen megawatts per minute.

Figure 1:
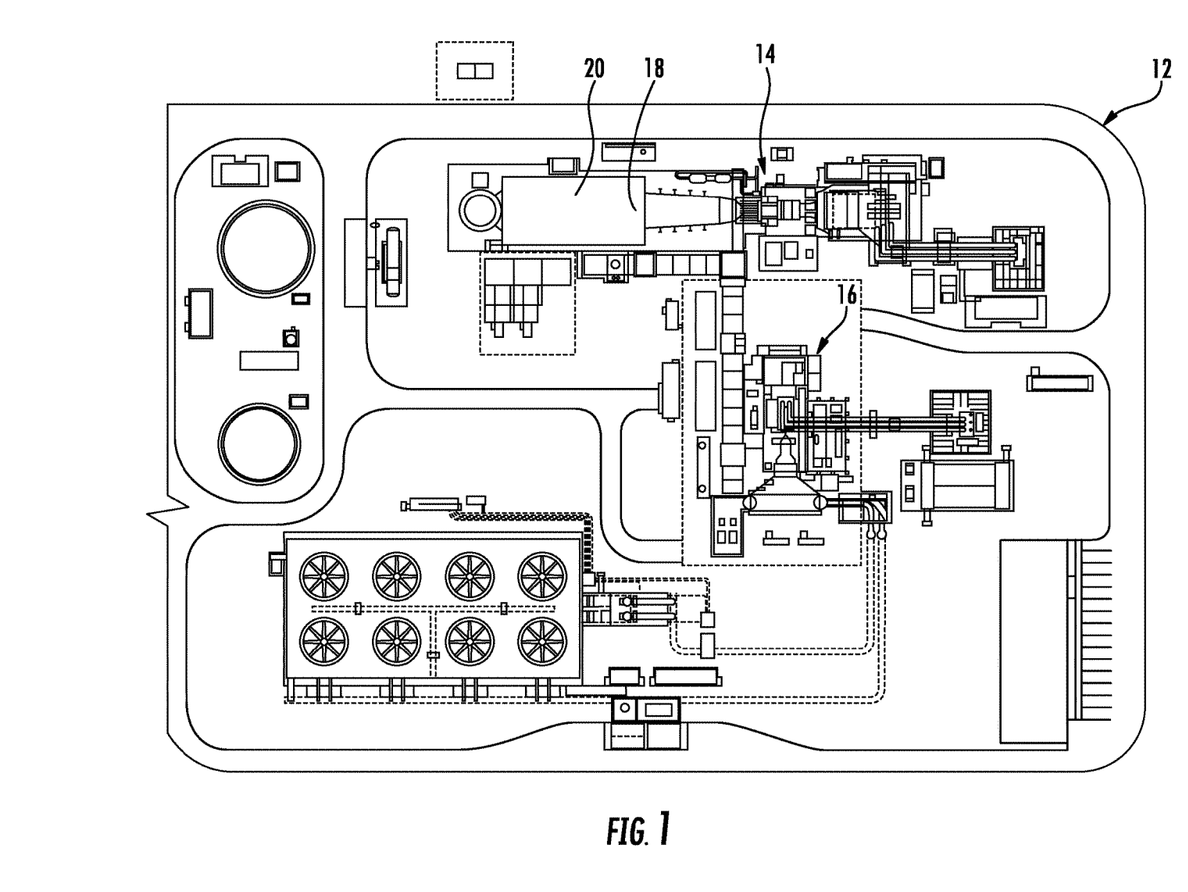
FIG. 1 is a schematic diagram of the duct fired, combined cycle power generation plant.
Figure 3:
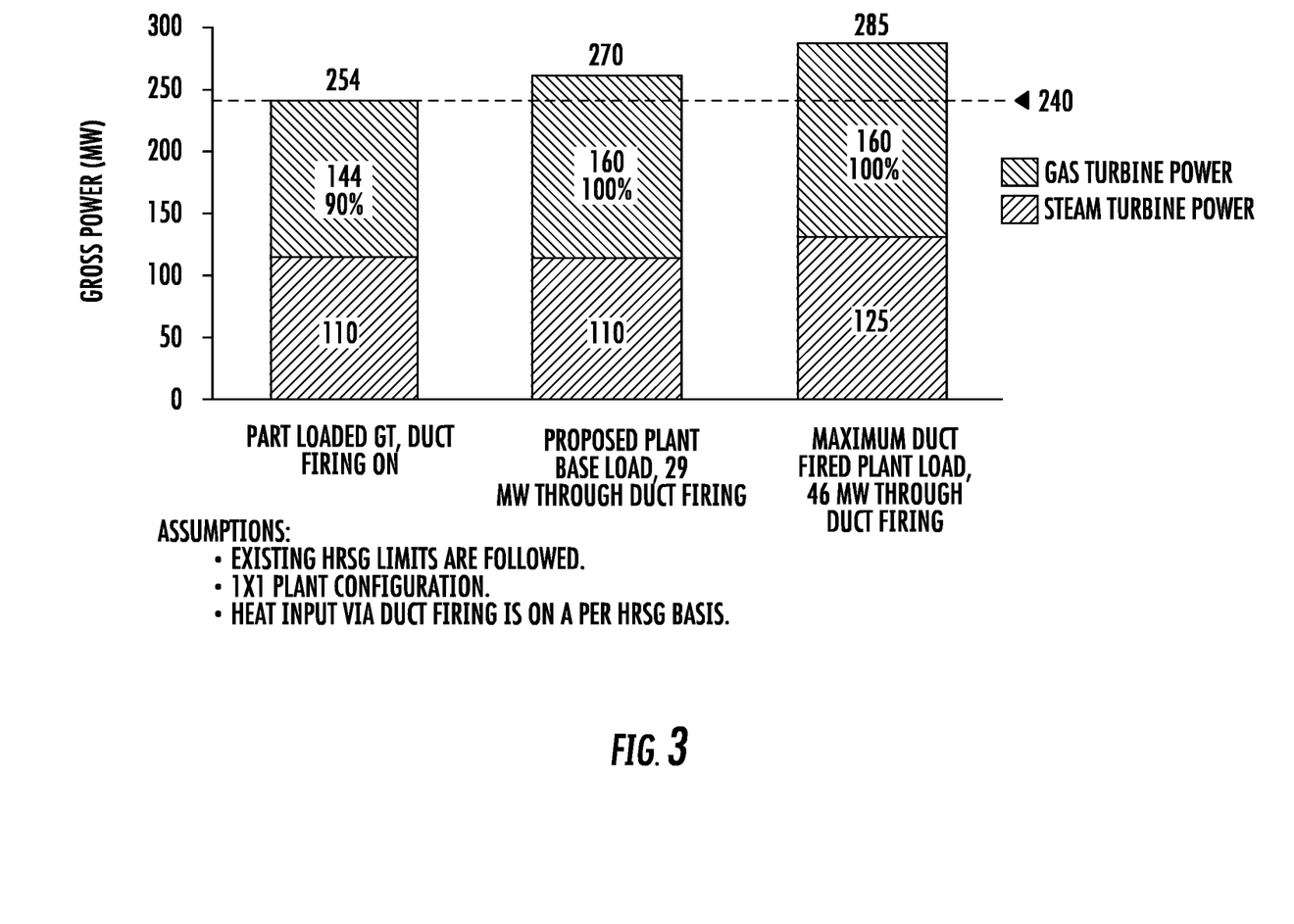
FIG. 3 is a graph of base load redistribution of the duct fired, combined cycle power generation plant.

For example, as shown in FIG. 1, the duct fired, combined cycle power generation plant 12 may be a 1×1 plant running a gas turbine engine 14 at part load less than 100 percent with at least one supplemental burner 18 operating together with at least one steam turbine engine 16 such that the total plant load is equal to the plant load with the gas turbine engine 14 and the at least one steam turbine engine 16 running at 100 percent with the at least one supplemental burner 18 turned off. In this case, the power generation plant 12 is formed from one gas turbine and one steam turbine. In other embodiments, a 2×1 plant has two gas turbines and one steam turbine. Using a heat recovery steam generator 20, one or more gas turbine engines 14 may be brought to a part load condition as the supplemental burners 18 may be turned on with the steam turbine engines 16 before base load operation of the gas turbine engines 14. As shown in FIG. 3, the output of the duct fired, combined cycle power generation plant 12 may be the same load level as the plant 12 achieves with gas turbine engines 14 at 100 percent load without use of supplemental burners 18. For example, if the gas turbine engine 14 is at 90 percent load and is an F class, which refers to the firing temperatures and efficiency of the gas turbine engine, without fast starting capability, the duct fired, combined cycle power generation plant 12 may be operated with about 15 megawatts of flexibility for very rapid load changes on a 1×1 plant at a rate of about 10 megawatts per minute. A ramp up process in which the gas turbine engine 14 is ramped up may be followed by an increase in output of the supplemental burner 18. As such, the approximately 15 megawatts of incremental gas turbine engine output may be augmented by incremental power from the steam turbine engines 16 resulting from the increase in exhaust energy from the gas turbine engines 14 at a rate of about 3-4 megawatts per minute, which provides the plant 12 with an effective plant ramp capability of about 15-20 megawatts per minute.

Figure 4:
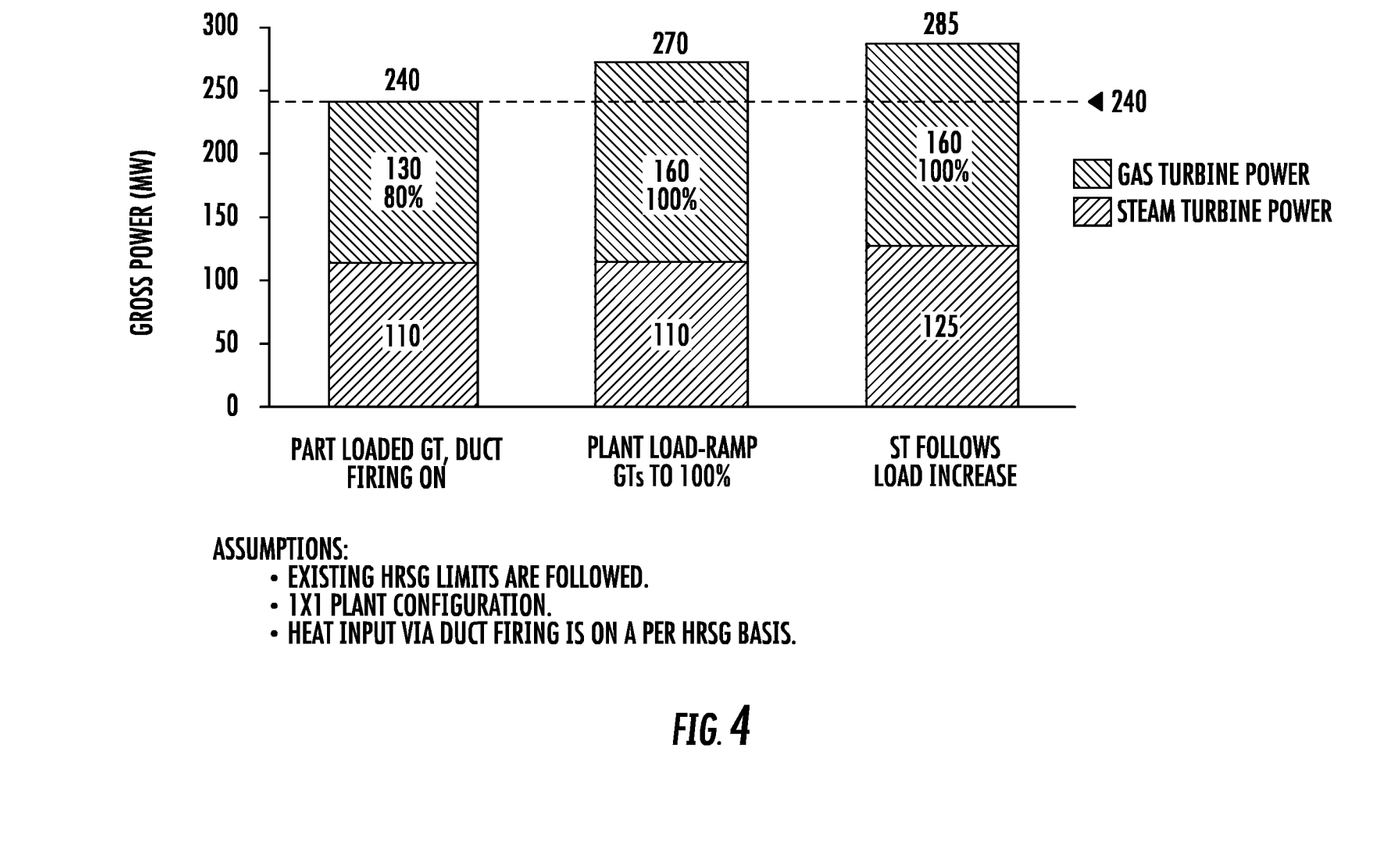
FIG. 4 is a graph of proposed ramp up of the duct fired, combined cycle power generation plant.

In another embodiment, as shown in FIG. 4, the duct fired, combined cycle power generation plant 12 may be operated with one or more gas turbine engines 14 at less than 90 percent, such as at 80 percent load, rather than an equivalent gross power output of the gas turbine engines 14 operating at 100 percent load with the supplemental burners 18 turned off. As such, the gas turbine engine 14 may have about 30 megawatts of flexible available output that may be added to the output of the plant 12 by increasing the output of the gas turbine engines 14. Based upon the rates discussed above, the 30 megawatts of additional output could be added to the output of the plant 12 in about two to three minutes.

Figure 5:
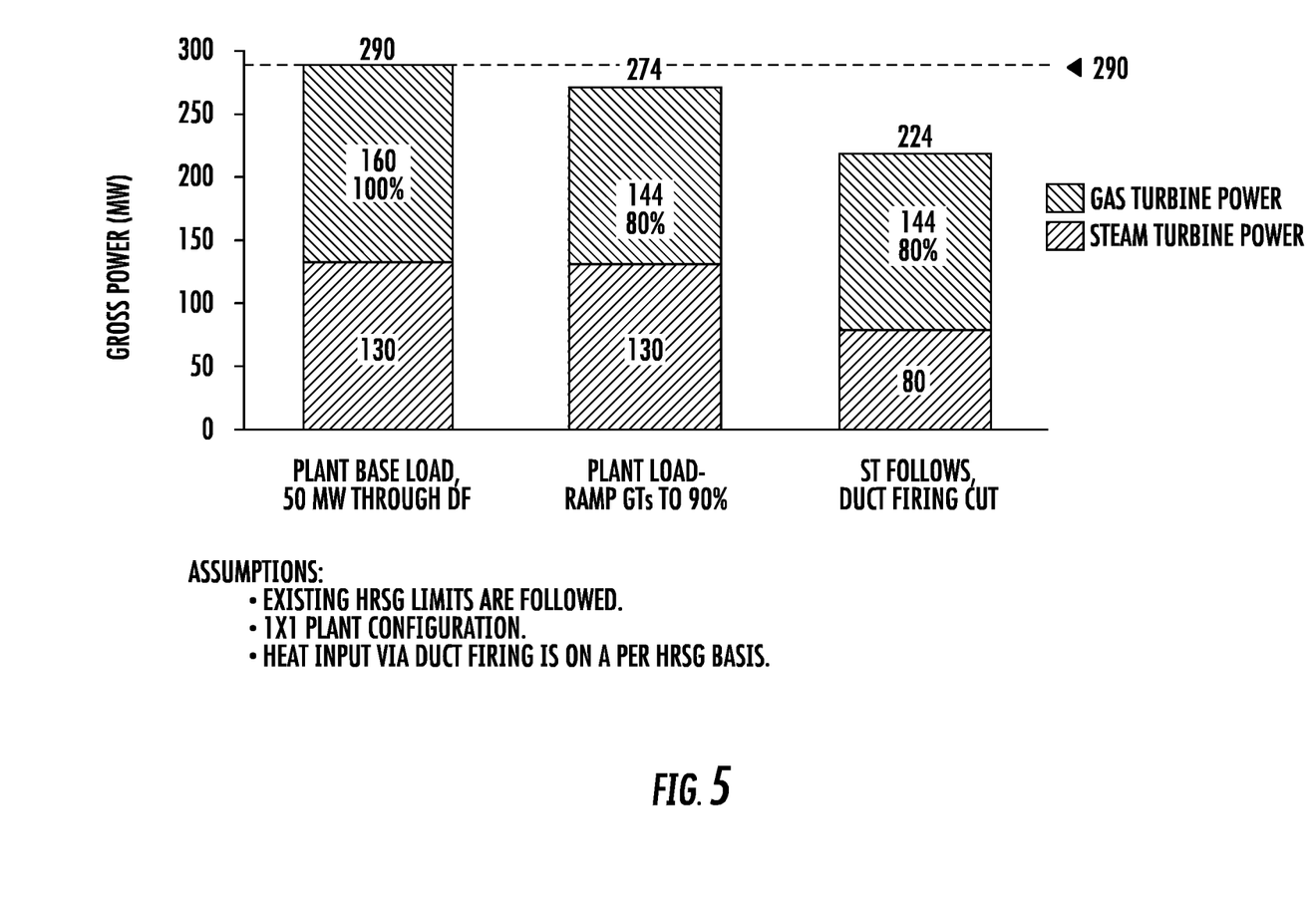
FIG. 5 is a graph of proposed ramp down of the duct fired, combined cycle power generation plant.

The method of using the system 10 may include a ramp down process in which output of the gas turbine engine 14 is ramped down. The ramp down process in which the output of the gas turbine engine 14 is ramped down may be followed by a decrease in output of the supplemental burner 18. As shown in FIG. 5, the method of using the system 10 whereby a ramp down of the gas turbine engine 14 is accomplished at a ramp rate that is faster than conventional systems in which the ramp down is initially only controlled by discontinuing use of duct burners. More specifically, FIG. 5 depicts a ramp down procedure wherein the gas turbine engine 14 ramps down at a rate of about 10-15 megawatts per minute, with a total ramp down of power output of about 70 megawatts in about four to five minutes.

In embodiments where the one or more gas turbine engines 14 have a fast start capability, the gas turbine engines 14 may ramp up or down at a rate of about 30 megawatts per minute. Thus, the process of ramping up or down the duct fired, combined cycle power generation plant 12 may be reduced to about one minute in time using the gas turbine engine 14 only, rather than the supplemental burner 18 and the steam turbine engine 16. The ramp rate of the gas turbine engine 14 drives the ramp of the entire duct fired, combined cycle power generation plant 12. The steam turbine engine 16 follows the ramp rate of the gas turbine engine 14 directionally but at a rate driven by the time constant of the heat recovery steam generator 20 and balance of systems of the plant 12. The rate of change of the steam turbine engine 16 will also be bounded by the steam turbine transient requirements of a particular turbine product.

In at least one embodiment, the system 10 may also be configured such that wherein firing at least one supplemental burner 18 to provide additional heat to a heat recovery steam generator 20, the supplemental burner 18 may be fired during a startup process in which the gas turbine engine 14 starts operating to enable the heat recovery steam generator 20 to warm up faster and allow excess steam to be provided to gland seals and a condenser. By allowing excess steam to be provided to gland seals and the condenser, less demand would be made of the auxiliary boiler such that the auxiliary boiler could be used less or eliminated. The system 10 may also be configured such that the heating surface of the heat recovery steam generator 20 could be arranged to optimize the entire heat recovery steam generator 20 design to maximize steam production from the heating surfaces downstream of the supplemental burner 18. For example, in a 1×1 cycle design, an intermediate pressure superheater may be positioned downstream of the supplemental burner 18. In a 1×1 cycle design, a high pressure superheater may be positioned downstream of the supplemental burner 18.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for increasing the responsiveness of a duct fired, combined cycle power generation plant, characterized in that:
    operating at least one gas turbine engine at a part load condition less than 100 percent load;
    operating at least one steam turbine engine via steam created at least in part from heat generated by the at least one gas turbine engine;
    firing at least one supplemental burner to provide additional heat to a heat recovery steam generator upstream from the at least one steam turbine engine such that combined output of the at least one gas turbine engine at part load and the at least one steam turbine engine with additional steam input generated by firing the at least one supplemental burner upstream of the heat recovery steam generator upstream is at least as great as operating the at least one gas turbine engine at 100 percent load condition and the at least one steam turbine engine at 100 percent load condition; and
    controlling the at least one gas turbine engine to change output of the at least one gas turbine engine to accommodate changes in output demand of the duct fired, combined cycle power generation plant,
    wherein the step of firing at least one supplemental burner to provide additional heat to a heat recovery steam generator upstream comprises firing at least one supplemental burner during a startup process in which the at least one gas turbine engine starts operating to enable the heat recovery steam generator to warm up faster and allow excess steam to be provided to gland seals and a condenser.

2. The method of claim 1, characterized in that controlling the at least one gas turbine engine to change output of the at least one gas turbine engine to accommodate changes in output demand comprises increasing output of the at least one gas turbine engine to increase output of the duct fired, combined cycle power generation plant to accommodate an increase in output demand.

3. The method of claim 2, characterized in that increasing output of the duct fired, combined cycle power generation plant to accommodate an increase in output demand comprises increasing output of the duct fired, combined cycle power generation plant at a rate of at least five megawatts per minute.

4. The method of claim 2, characterized in that increasing output of the duct fired, combined cycle power generation plant to accommodate an increase in output demand comprises increasing output of the duct fired, combined cycle power generation plant at a rate of at least ten megawatts per minute.

5. The method of claim 2, characterized in that increasing output of the duct fired, combined cycle power generation plant to accommodate an increase in output demand comprises increasing output of the duct fired, combined cycle power generation plant at a rate of at least fifteen megawatts per minute.

6. The method of claim 1, characterized in that operating at least one gas turbine engine at a part load condition less than 100 percent load comprises operating the at least one gas turbine engine at a part load condition less than 90 percent load.

7. The method of claim 1, further characterized in that a ramp up process in which the at least one gas turbine engine is ramped up followed by an increase in output of the at least one supplemental burner.

8. The method of claim 1, further characterized in that a ramp down process in which output of the at least one gas turbine engine is ramped down.

9. The method of claim 8, characterized in that the ramp down process in which the output of the at least one gas turbine engine is ramped down is followed by a decrease in output of the at least one supplemental burner.

* * * * *